United States Patent [19]
Fukui

[11] Patent Number: 6,167,199
[45] Date of Patent: Dec. 26, 2000

[54] INFORMATION TRANSMITTING APPARATUS USING FLASH LIGHT EMISSION

[75] Inventor: Hajime Fukui, Tokyo, Japan

[73] Assignee: Canon Kabushiki Kaisha, Tokyo, Japan

[21] Appl. No.: 09/386,045

[22] Filed: Aug. 30, 1999

[30] Foreign Application Priority Data

Sep. 1, 1998 [JP] Japan ................................. 10-261035

[51] Int. Cl.$^7$ ........................ G03B 15/05; H05B 37/00; H04B 10/00
[52] U.S. Cl. ........................ 396/57; 396/157; 396/173; 315/241 P; 359/142
[58] Field of Search ................................ 396/57, 155, 157, 396/173; 315/241 P, 241 S; 359/180, 142

[56] References Cited

U.S. PATENT DOCUMENTS

| | | | |
|---|---|---|---|
| 4,048,540 | 9/1977 | Iida et al. ................................. | 315/241 |
| 5,384,611 | 1/1995 | Tsuji et al. ................................. | 396/57 |
| 5,446,512 | 8/1995 | Makoto Mogamiya ................. | 354/131 |
| 5,491,533 | 2/1996 | Sakamoto ................................. | 396/173 |
| 5,668,445 | 9/1997 | Matsui ................................. | 315/241 P |
| 6,034,486 | 3/2000 | Fukui ................................. | 396/241 P |

OTHER PUBLICATIONS

Patent Abstracts of Japan JP 04 343336 A, published Nov. 11, 1992, vol. 017, No. 197 (P–1523).
Patent Abstracts of Japan JP 05 019336A, published Jan. 29, 1993, vol. 017, No. 290 (P–1549).

*Primary Examiner*—W. B. Perkey
*Attorney, Agent, or Firm*—Robin, Blecker & Daley

[57] ABSTRACT

In an information transmitting apparatus capable of transmitting information by using flash light emission of a flash light emission tube, communication data is detected at timing synchronized with a predetermined period and, when the detected communication data indicates a light emission instruction, a predetermined light emission signal is formed and outputted to cause the flash light emission tube to make light emission, wherein a time interval from a point of time at which the light emission instruction has been detected to a point of time at which the light emission signal is outputted is varied according to a time interval from a point of time at which the preceding light emission has been performed to a point of time at which the light emission instruction for the current light emission is detected, so that the intervals of flash light emission are adjusted.

4 Claims, 6 Drawing Sheets

FIG. 1

FIG.2(A)
CLK

FIG.2(C)
DO
 BUSY DURING LIGHT EMISSION
T0    T1

FIG.2(D)
TRANSMISSION TIMING SIGNAL

FIG.2(E)
TRANSMISSION SIGNAL 1  0  0  0  1  1  1  1
START D7 D6 D5 D4 D3 D2 D1 D0

FIG.2(F)
GATE SIGNAL t4           t1 t4 t4 t4

FIG.2(G)
TRIGGER SIGNAL

FIG.2(H)
LIGHT EMISSION PULSE

RELEASE RECOGNIZING SIGNAL
HAVING PREDETERMINED INTERVAL

CLOCK SIGNAL

FIG. 8(B)

INFORMATION SIGNAL

FIG. 8(C)

LIGHT PULSE

FIG. 8(D)

SIGNAL RECEIVING DEVICE

INFORMATION TRANSMITTING APPARATUS USING FLASH LIGHT EMISSION

BACKGROUND OF THE INVENTION

1. Field of the Invention

The present invention relates to an information transmitting apparatus arranged to transmit information by using flash light emission.

2. Description of Related Art

Typical examples of known information transmitting apparatuses arranged to transmit optical information include remote controllers of TV sets, video tape recorders and the like. These remote controllers are arranged to use an infrared-emitting diode (IRED) as a light emitting device. The infrared-emitting diode has a quick responsivity and is capable of accurately transmitting information at a high speed. However, a shortcoming of the infrared-emitting diode lies in that the light emission output thereof is small and can reach only a short distance of several meters.

Figure 6:
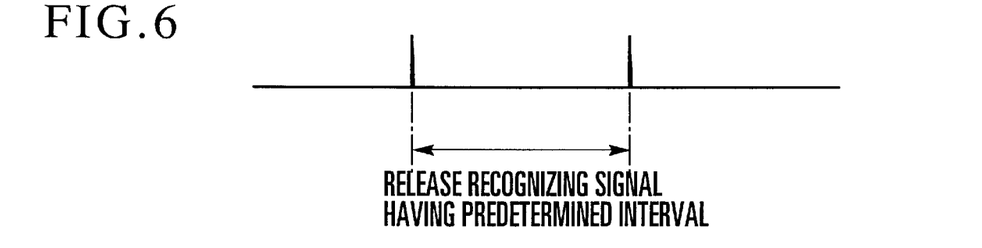
FIG. 6 is a timing chart showing the light emission timing of a conventional light release device.

The reachable distance can be made longer by using a light emitting device having an intense light output. In the past, some apparatus was developed to use a flash light emission tube having a large amount of light output for the light emitting device. For example, a light release device disclosed in Japanese Laid-Open Utility Model Application No. SHO 55-99529 is arranged to control a shutter release action by emitting flash light from a signal transmitting side at intervals as shown in FIG. 6, and by receiving the flash light on the side of a photo-taking apparatus such as a camera or the like.

Further, a camera system disclosed in Japanese Laid-Open Patent Application No. HEI 4-343336 also uses a flash light emission tube as a light emitting device. This camera system is arranged, as shown in FIG. 7, to cause the flash light emission tube of a built-in flash light emission device of the camera to emit two control pulses at a predetermined interval and, upon lapse of a predetermined period of time after emission of the two control pulses, to emit one light emission start pulse for a slave flash device (a wireless flash device) in synchronism with the full open of the shutter.

Figure 7:
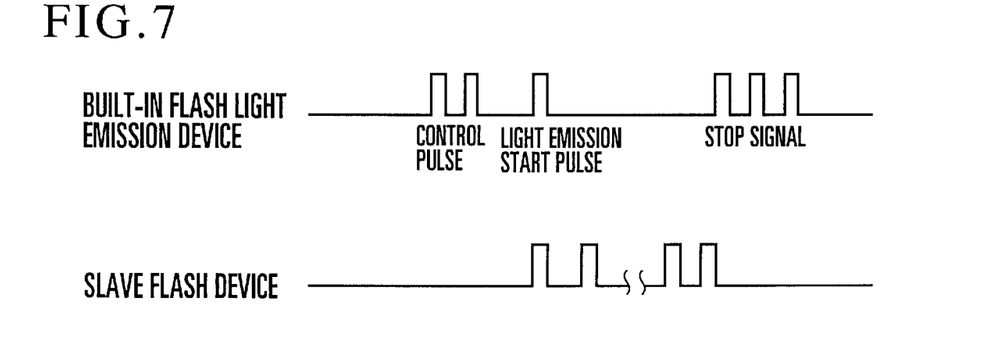
FIG. 7 is a timing chart showing the light emission timing of a conventional camera system.

Compared with the conventional arrangement for using a light emitting diode, the arrangement for using a flash light emission tube as a light emitting device is capable of emitting a light signal (the control pulses and the light emission start pulse shown in FIG. 7) which has light emission energy per pulse several hundred or several thousand times as much as the light emission energy of the conventional arrangement and can reach a very far distance.

However, in a case where a flash light emission tube is used as the light emitting device, the following problem arises. When the flash light emission tube is in a cool state, i.e., in a case where a light pulse is emitted after the lapse of a long interval time from the previous light pulse emission, a time lag of scores of microseconds takes place before the actual start of light emission from the flash light emission tube even with a high trigger voltage applied to cause the flash light emission tube to start light emission. In a case where the flash device is caused to continuously emit light at time intervals of one hundred microseconds or thereabout, on the other hand, the ions of gas such as Xe (xenon) gas sealed in the flash light emission tube still remain in a sufficient quantity within the flash light emission tube. When a trigger signal is applied to the flash light emission tube under such a condition, light emission immediately begins. In other words, the time lag before actual light emission after application of a trigger signal is long in the case of a long interval between the first light emission or previous light emission and the next light emission, and is short while light emission is continuously made. Under such a condition, the intervals of light emission pulses become uneven to make accurate communication impossible.

Figure 8A:
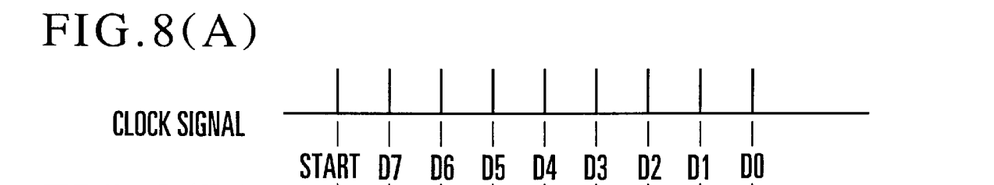
FIGS. 8(A) to 8(D) are timing charts showing, by way of example, how accurate transmission of information is prevented by lagging of light emission from a flash light emission tube.
Figure 8B:
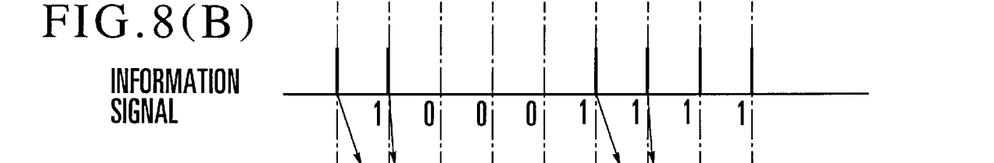
Figure 8C:
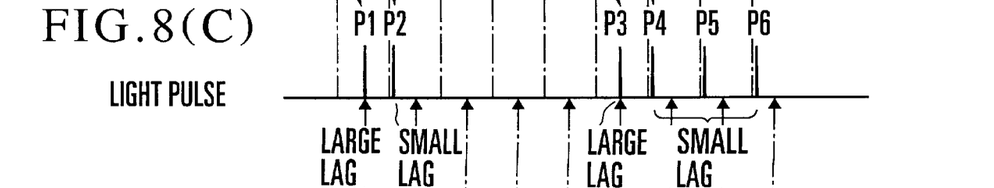

FIGS. 8(A) to 8(D) show in a timing chart, by way of example, how accurate information communication is caused to become impossible by the delays, or time lags, of light emission from a flash light emission tube. FIG. 8(A) shows a synchronizing clock signal which is a reference signal to be used for conducting optical communication. An optical information signal is sent out at intervals which coincide with the synchronizing clock signal. FIG. 8(B) shows the information signal to be sent in synchronism with the synchronizing clock signal. For example, a signal of "10001111" is sent. In FIG. 8(B), reference symbol START denotes a signal which is added in front of information signal data transmitted to give information of the start of signal transmission to a signal receiving device. FIG. 8(C) shows light pulses actually emitted from the flash light emission tube when a trigger signal is applied to the flash light emission tube in synchronism with the information signal shown in FIG. 8(B). As shown in FIG. 8(C), the first light pulse P1 synchronized with the START signal and the intermediate light pulse P3, each of which is emitted after the lapse of a long interval from the preceding light emission, lag and delay to a great extent from their corresponding parts of the information signal shown in FIG. 8(B). The light pulse P2 and the light pulses P4 to P6, each of which is emitted continuously from the preceding light emission, do not show much lagging. Therefore, the intervals of light pulse emission become uneven.

Figure 8D:
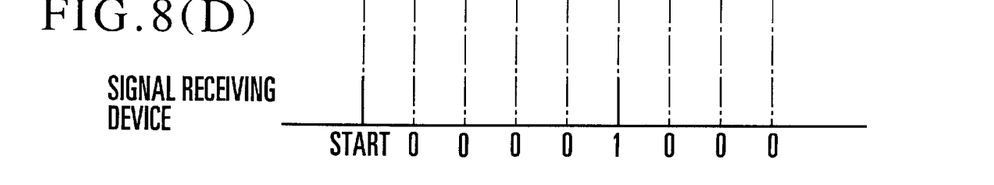

On the other hand, as shown in FIG. 8(D), since the signal receiving device is arranged to make checks for the presence or absence of the light pulses at intervals of a fixed period of time and only during a short period of time, after receipt of the light pulse P1 emitted in synchronism with the START signal, the information signal transmitted as "10001111" from the signal transmitting side would be received as "00001000" because only the light pulse P3 which is emitted after about the same extent of lag (delay) as the light pulse P1 can be recognized. Under such a condition, it is hardly possible to accurately conduct communication.

BRIEF SUMMARY OF THE INVENTION

In accordance with one aspect of the invention, there is provided an information transmitting apparatus using flash light emission, which comprises a flash light emission tube, light-emission-signal outputting means for detecting communication data at timing synchronized with a predetermined period and for, when the detected communication data indicates a light emission instruction, forming and outputting a predetermined light emission signal to cause the flash light emission tube to make light emission, and varying means for varying a time interval from a point of time at which the light emission instruction has been detected to a point of time at which the light emission signal is outputted, according to a time interval from a point of time at which the preceding light emission has been performed to a point of time at which the light emission instruction for the current light emission is detected, so that the intervals of flash light emission are adjusted.

The above and further aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
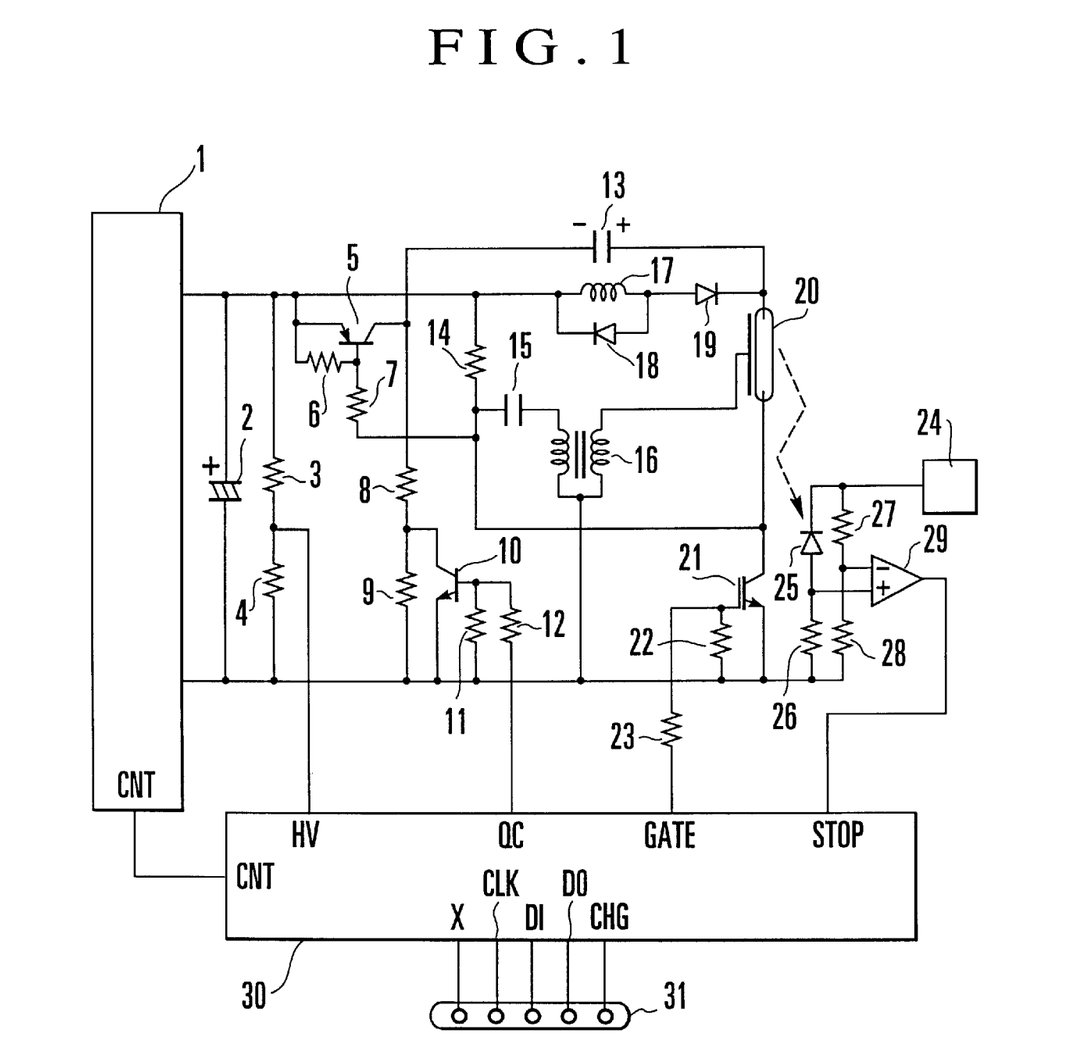
FIG. 1 is a circuit diagram showing the circuit arrange ent of an information transmitting apparatus according to an embodiment of the invention.

FIG. 1 shows the circuit arrangement of an information transmitting apparatus according to the embodiment of the invention. In the case of the embodiment of the invention, a flash device is used as the information transmitting apparatus. In FIG. 1, reference numeral 1 denotes a known DC—DC converter (power supply means). A main capacitor 2 which is electric energy accumulating means is connected between the output terminals of the DC—DC converter 1. A series circuit, which is composed of resistors 3 and 4 and is provided for detecting the output voltage of the DC—DC converter 1, is connected in parallel with the main capacitor 2. The emitter of a transistor 5 is connected to the positive terminal of the DC—DC converter 1. A resistor 6 is connected between the base and emitter of the transistor 5. A series circuit composed of resistors 8 and 9 is connected between the collector of the transistor 5 and the ground. The collector and emitter of a transistor 10 are connected between the juncture of the resistors 8 and 9 and the ground. A resistor 11 is connected between the base of the transistor 10 and the ground. One end of a resistor 12 is connected to the base of the transistor 10. One end of a voltage doubling capacitor 13 is connected to the collector of the transistor 5.

A circuit which is formed by series-connecting a resistor 14, a capacitor 15 and the primary winding of a trigger transformer 16 is connected between the positive terminal of the DC—DC converter 1 and the ground. A coil 17 for controlling a light emission current is connected to the positive terminal of the DC—DC converter 1. A diode 18 is parallel-connected to the coil 17 in a direction opposite to the polarity of the output of the DC—DC converter 1. A diode 19 is connected to the output terminal of the coil 17 to have a forward output. The output terminal of the diode 19 is connected to one end of a xenon tube (flash light emission tube) 20. The trigger electrode of the xenon tube 20 is connected to the secondary winding of the trigger transformer 16. The other end of the xenon tube 20 is connected to other ends of the resistors 7 and 14 and the collector of an IGBT 21 (light emission control means). The emitter of the IGBT 21 is grounded. A resistor 22 is connected to the gate of the IGBT 21 and the ground. One end of a resistor 23 is connected to the gate of the IGBT 21.

Between the output terminal of a reference voltage generating circuit 24 and the ground, a series circuit composed of a photodiode 25 and a resistor 26 and another series circuit composed of resistors 27 and 28 are connected in parallel. Input terminals of a comparator 29 are connected respectively to the intermediate connection nodes of these parallel-connected series circuits. To a microcomputer 30 which is arranged to control the whole information transmitting apparatus, there are connected the output terminal of the comparator 29, the terminal CNT of the DC—DC converter 1, the juncture of the resistors 3 and 4 and other ends of the resistors 12 and 23. A light emission amount control circuit is formed jointly by the reference voltage generating circuit 24, the photodiode 25, the comparator 29 and the circuits arranged around them. The microcomputer 30 is provided with terminals of varied kinds including terminals CNT, HV, QC, GATE and STOP. In addition to these terminals, the microcomputer 30 also has terminals X, DI, CHG, etc., connected to a connector 31 which is provided for connection with terminals provided on a camera (not shown).

The DC—DC converter 1 is capable of controlling a charging action through the terminal CNT. The DC—DC converter 1 is arranged to boost the voltage of the power supply battery up to several hundred volts and to charge the main capacitor 2 with the voltage. The voltage of the main capacitor 2 is divided by the resistors 3 and 4 which are connected in parallel with the main capacitor 2. The voltage thus obtained is detected by the microcomputer 30. The microcomputer 30 then controls the terminal CNT of the DC—DC converter 1 in such a way as to charge the main capacitor 2 with a voltage suited for light emission. A voltage doubling circuit for doubling the voltage of the main capacitor 2 is formed jointly by the transistor 5, the resistors 6 to 9, the transistor 20, the resistors 11 and 12 and the voltage doubling capacitor 13. A voltage which is obtained by adding the voltage of the voltage doubling capacitor 13 to the voltage of the main capacitor 2 is thus arranged to be applied to the xenon tube 20.

The diode 18 is a flywheel diode which is arranged to absorb a voltage generated at the coil 17 when light emission is bought to a stop. The diode 19 is arranged to hold a voltage in such a way as to cause the doubled voltage applied from the voltage doubling capacitor 13 to be applied only to the anode of the xenon tube 20 at the time of light emission from the xenon tube 20. The connector 31 is provided for serial communication with the camera.

The functions of terminals of the microcomputer 30 are next described. The terminal CNT is an output terminal for control over the charging action of the DC—DC converter 1. The terminal HV is an analog-to-digital (A/D) conversion input terminal which is provided for monitoring the voltage of the main capacitor 2. The terminal QC is an output terminal for control over a charging action on the voltage doubling capacitor 13 to have the voltage doubling capacitor 13 quickly charged. The terminal GATE is an output terminal for control over the gate of the IGBT 21. The terminal STOP is an input terminal provided for inputting a light emission stop signal. The terminal X is an input terminal for inputting a light emission instruction signal from the camera. The terminal CLK is an input terminal for inputting a serial clock signal to be used for serial communication with the camera in a known manner. The terminal DI is a serial data input terminal. The terminal DO is a serial data output terminal. The terminal CHG is a current output terminal for transmitting information to the camera as to whether or not the light emission by the flash device can be made.

The operation of the whole circuit arrangement shown in FIG. 1 is next described. When a power supply switch (not shown) is turned on, the microcomputer 30 begins to constantly monitor the terminal voltage of the main capacitor 2 through the terminal HV. To make the voltage sufficient for light emission from the xenon tube 20, the microcomputer 30 causes the DC—DC converter 1 to act, through the terminal CNT, if the voltage is low, and stops the DC—DC converter 1 from acting if the voltage is high. The main capacitor 2 thus can be controlled to have a predetermined voltage.

When the voltage of the main capacitor 2 reaches a voltage level sufficient for light emission from the xenon tube 20, the microcomputer 30 causes a predetermined amount of current to flow from the terminal CHG to inform the camera (not shown) that information using the light emission has become communicable. Then, to transmit the information using the light emission through the information transmitting apparatus to a data receiving apparatus (not shown), the camera sends information on transmission data to the microcomputer 30 by known serial communication through the serial clock signal input terminal CLK, the serial data input terminal DI and the serial data output terminal DO. If the data receiving apparatus is a flash device, for example, this information may include an amount of light emission, the mode of light emission such as flash light emission or a long-time light emission mode called the focal plane (FP) light emission, a length of time of light emission, or the like. If the data receiving apparatus is a release control apparatus connected to another camera, this information may be any information that relates to a shutter speed, an aperture value, shutter release start timing, or the like.

Upon receipt of such information from the camera, the information transmitting apparatus operates as follows. FIGS. 2(A) to 2(H) are timing charts showing the operation to be performed when the above-stated information is received from the camera. Reference symbol CLK in FIG. 2(A), reference symbol DI in FIG. 2(B) and reference symbol DO in FIG. 2(C) indicate known serial communication conducted between the camera and the microcomputer 30. Data is sent from the camera to the microcomputer 30 in synchronism with the synchronizing clock signal CLK through the terminal DI. In replay to the data, data is sent from the microcomputer 30 to the camera through the terminal DO.

Figures 2A, 2B, 2C:
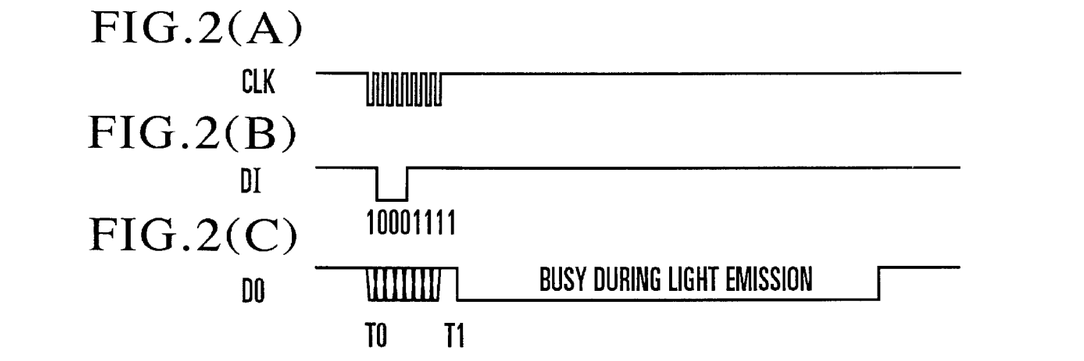
FIGS. 2(A) to 2(H) are timing charts showing the operations which are performed by the information transmitting apparatus shown in FIG. 1 when receiving information
Figure 2D:
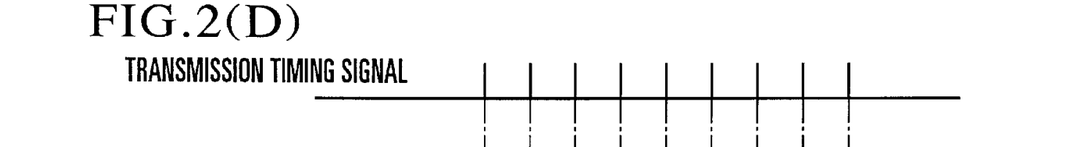
Figure 2E:
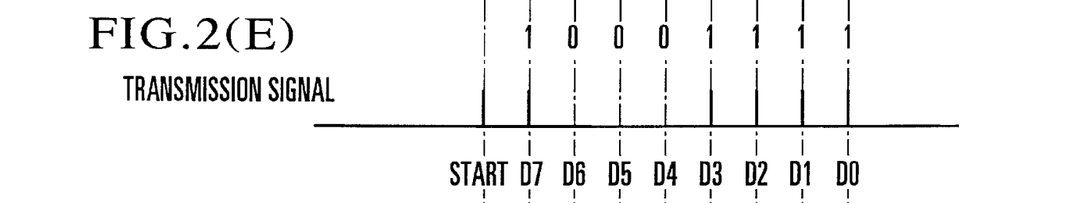

The serial communication begins at a point of time T0. Data to be transmitted (transmission data) is outputted from the camera to the terminal DI of the information transmitting apparatus, as shown in FIG. 2(B). After the communication is conducted for a predetermined number of clock pulses, at a point of time T1, the terminal DO is set at a low level to indicate that the information transmitting apparatus is in process of light emission. In the case of the example shown in FIGS. 2(A) to 2(H), data "110001111", which indicates the timing of light emission, is assumed to be communicated from the microcomputer 30. FIG. 2(D) indicates a transmission timing signal indicative of a predetermined information communicating speed at which optical communication is to be conducted between the information transmitting apparatus (which is a flash device, in this case) and the data receiving apparatus (which is not shown but may be, for example, a slave flash device having a signal receiving part). The transmission timing signal is formed as a clock signal having a predetermined period within the microcomputer 30. In synchronism with the transmission timing signal, the microcomputer 30 forms a transmission signal as shown in FIG. 2(E). The transmission signal is formed by adding a start bit indicative of the start of the optical communication to the transmission data. Data which follows the start bit is a signal for causing light emission when the data is "1" in accordance with the MSB first rule. In other words, the transmission signal shown in FIG. 2(E) is formed by adding the start bit to the above-stated data "10001111" sent to the microcomputer 30.

As described with reference to FIGS. 8(A) to 8(D), when light emission is performed by the information transmitting apparatus in synchronism with the information signal (FIG. 8(B)), the time lag (delay) of light emission from the xenon tube 20 causes the light emission pulses to be actually emitted to have uneven intervals between them (see FIG. 8(C)). To solve this problem, according to the embodiment of the invention, the light emission start timing is corrected so as to make light emission intervals of the Xe tube 20 almost constant, by the steps of operation procedures described below with reference to FIGS. 3 and 4, which are flow charts.

Figure 2F:
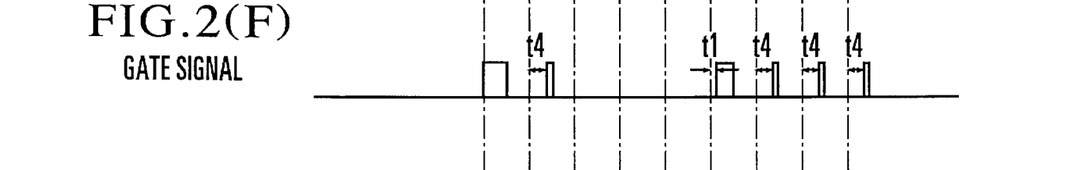
Figure 3:
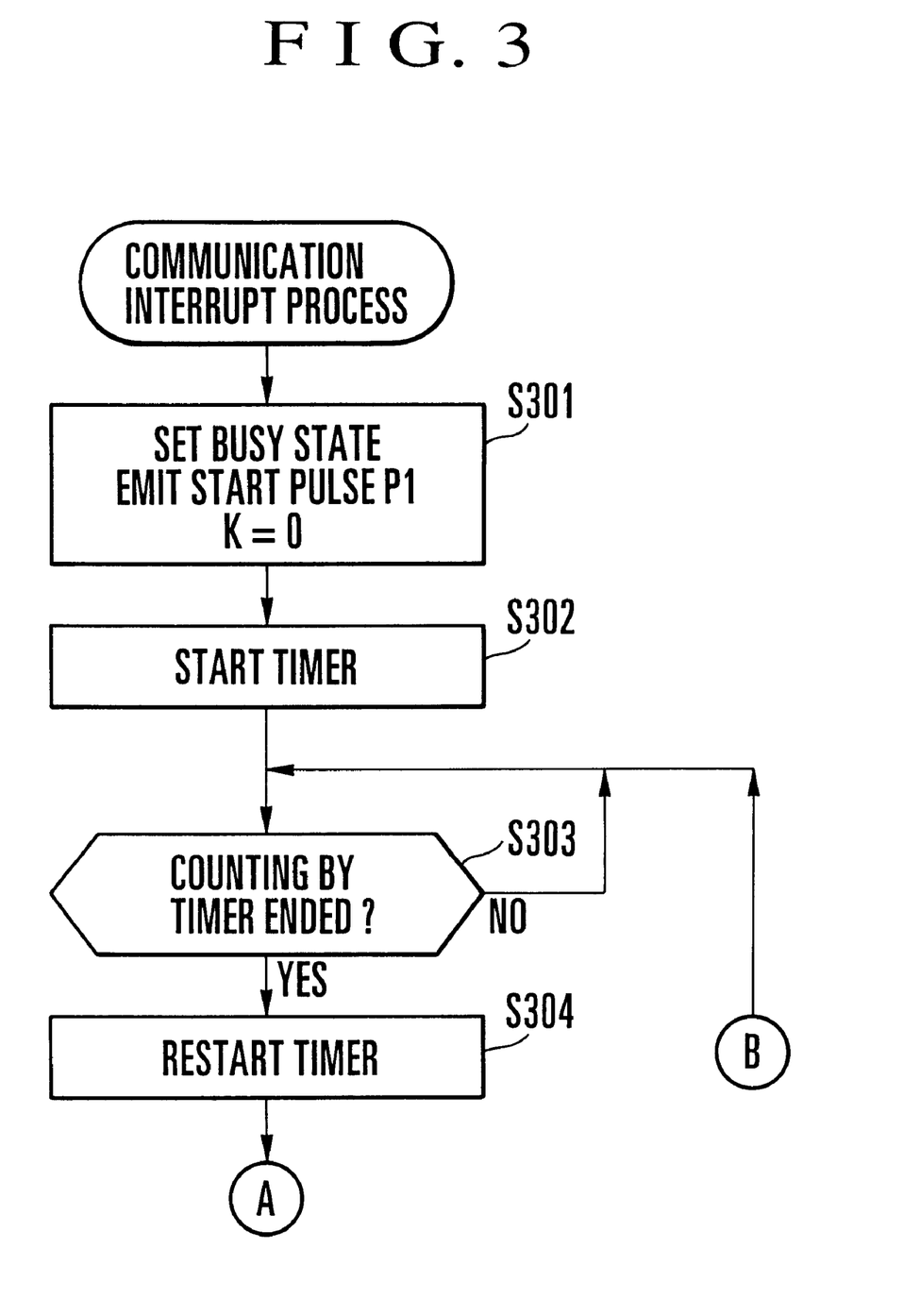
FIG. 3 is a flow chart showing processes to be executed by the information transmitting apparatus according to the embodiment of the invention.
Figure 4:
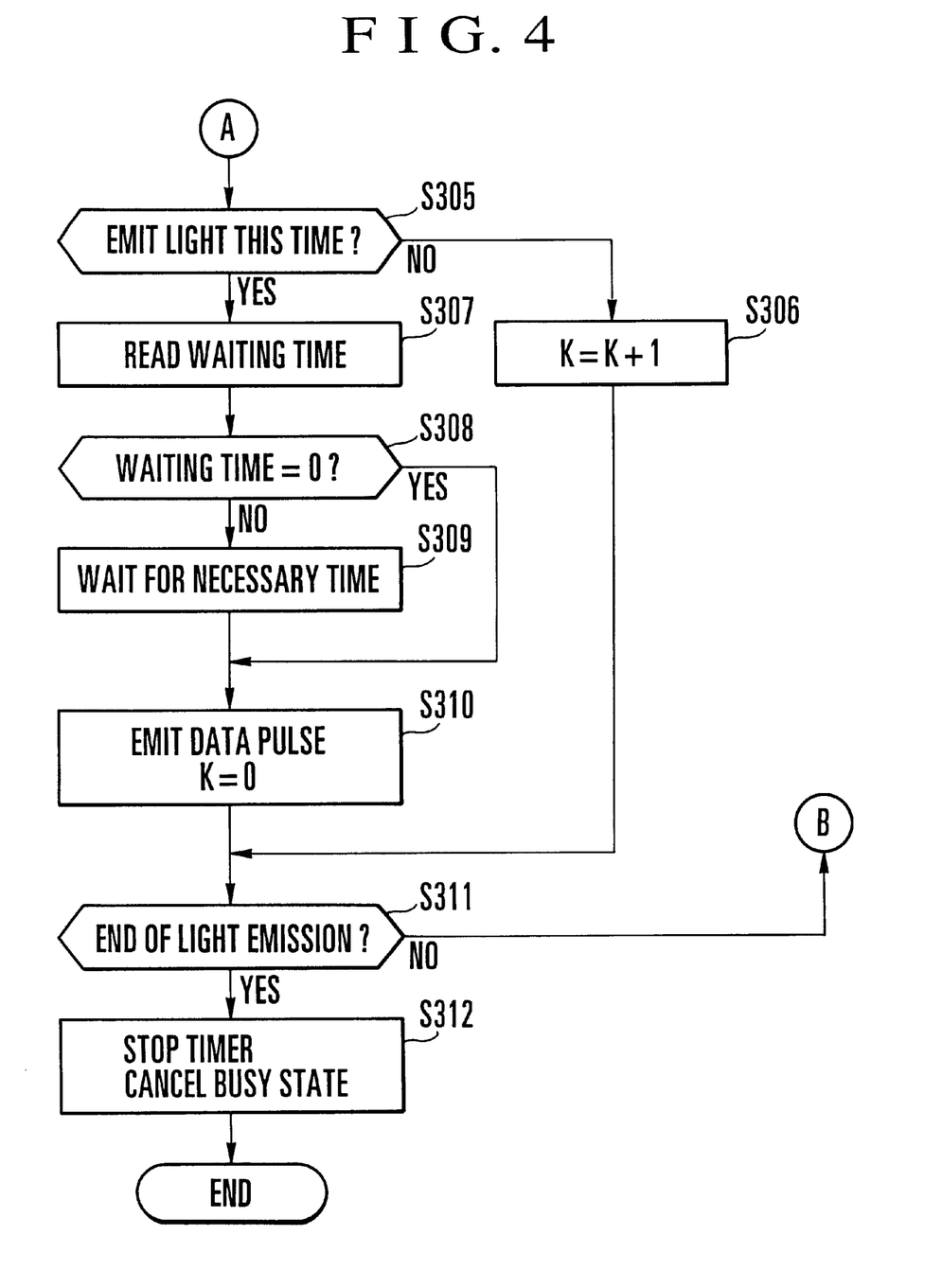
FIG. 4 is a flow chart showing processes to be executed continuously from the flow chart of FIG. 3.

Referring to FIGS. 3 and 4, when the serial communication is made from the camera, a communication interruption takes place at the microcomputer 30. Then, a communication interrupt process shown in FIG. 3 starts. The microcomputer 30 sets the terminal DO to a low level to indicate that the information transmitting apparatus is performing a process for light emission. Next, the terminal GATE is set to a high level to generate a gate signal as shown in FIG. 2(F). The xenon tube 20 is then caused to emit a start pulse P1. This light emitting process will be described later with reference to the flow chart of FIG. 5. When a light emission step S301 of FIG. 3 or S310 of FIG. 4 is executed, the microcomputer 30 sets the terminal GATE to a high level to execute a light emission process. Then, at the step S301, the microcomputer 30 sets a light emission interval counter K set in a RAM (not shown) disposed within the microcomputer 30 to "0". Subsequently, at a step S302, a timer disposed within the microcomputer 30 to decide the light emission time of the next pulse is started. At a step S303, the flow of operation loops around the step S303 until arrival of the light emission time of the next pulse. Upon completion of the count of a predetermined period of time by the timer, the flow proceeds from the step S303 to a step S304. At the step S304, the timer is restarted, in the same manner as at the step S302, for the next light emission. The flow of operation proceeds from the step S304 of FIG. 3 to a step S305 of FIG. 4. At the step S305 of FIG. 4, light emission data received from the camera is checked to find if the bit thereof currently received is "1" thus indicating that light emission is to be made this time. If so, the flow proceeds to a step S307. If not, i.e., if the bit of the light emission data is found to be "0", the flow proceeds from the step S305 to a step S306. At the step S306, "1" is added to the count value of the light emission interval counter K. The flow then proceeds from the step S306 to a step S311.

At the step S307, with the light emission found at the step S305 to be made this time, reference is made to a table 1, according to the value of the light emission interval counter K which indicates how many pulses before the preceding light emission has been performed. A period of waiting time before actually giving a trigger signal is decided by making reference to the table 1 which is as shown below.

TABLE 1

[Waiting Time Table]

| K: | 0 | 1 | 2 | 3 | 4 and above |
|---|---|---|---|---|---|
| waiting time: | t4 | t3 | t2 | t1 | 0 |

(Note: t4 > t1 > 0)

As shown in Table 1, the waiting time is set to be shorter accordingly as the time interval from the preceding light emission to the current light emission is longer, and the waiting time is set to be longer accordingly as the time interval from the preceding light emission to the current light emission is shorter.

Accordingly, while the details of the gate signal shown in FIG. 2(F) will be described later with regard to steps S501 to S503 for the pulse light emission process in FIG. 5, the microcomputer 30 causes each pulse of the gate signal to rise after the lapse of the waiting time obtained by referring to the "waiting time table" (Table 1) on the basis of the transmission signal (FIG. 2(E)). Then, the microcomputer 30 brings the light emission of the xenon tube 20 to a stop, by rendering the level of the terminal GATE low to cause each pulse of the gate signal to fall, either when the level of the terminal STOP is detected to have become low or after the lapse of a predetermined period of time even if the terminal STOP is at a low level.

Figure 2G:
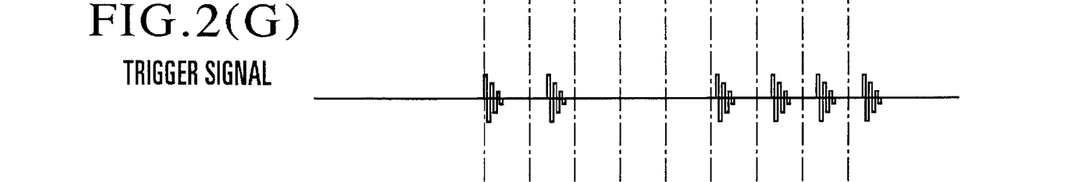
Figure 2H:
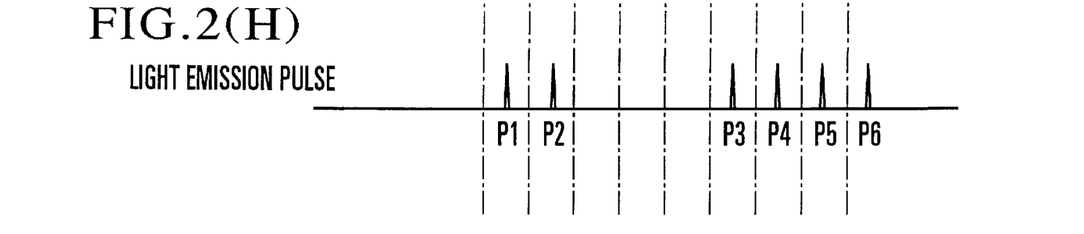

Further, a trigger signal shown in FIG. 2(G) is generated at the trigger transformer 16 with the IGBT 25 rendered conductive when the level of the terminal GATE becomes high, as will be described later. FIG. 2(H) shows light emission pulses generated by the xenon tube 20.

Referring again to FIG. 4, at a step S308, a check is made to find if the waiting time decided at the step S307 is "0". If so, the flow proceeds to a step S310. If the waiting time is a value other than "0", the flow proceeds to a step S309. At the step S309, the time for giving the trigger signal, i.e., the time for setting the level of the gate signal (FIG. 2(F)) to a high level, is delayed as much as the predetermined time as decided. At the step S310, a pulse is emitted in the same manner as at the step S301, and, at the same time, the light emission interval counter K is set to "0". At the step S311, a check is made to find if light emission for a predetermined number of bits has been completed. If not, the flow returns to the step S303 to repeat light emission processes until the last bit D0 is obtained. Upon completion of the light emission, the flow proceeds to a step S312. At the step S312, the light emission time measuring timer is stopped, and the busy state is canceled. The flow of light emission processes thus comes to an end.

In the foregoing description, the steps S305 to S307 which relate to the waiting time computing process, etc., are described as arranged, for simplifying the description, to be sequentially executed after the count of the timer is incremented. To eliminate the processing time lag, however, it is preferable to have a preparatory process executed for the next light emission before completion of time count by the timer at the step S303.

The processes shown in FIGS. 3 and 4 are described by way of example below with the processing data assumed to be "10001111" as shown in FIG. 2(B).

With the start pulse P1 emitted at the step S301, at the point of time D7 shown in FIG. 2(E) after the lapse of a predetermined time (the period of the transmission timing signal shown in FIG. 2(D)) for the steps S302 and S303, the light emission data is "1". The flow, therefore, proceeds from the step S305 to the step S307. At this time, since the value of the counter K is "0", the lapse of the waiting time t4 of Table 1 corresponding to the value "0" of the counter K is awaited, and, after that, the light emission corresponding to the transmission signal is performed at the step S310 (the light emission for the pulse P2 is performed by setting the terminal GATE to the high level). Next, the counter K is set to "0", and the flow returns to the step S303. At the next transmission point of time D6, since the light emission data is "0", the flow proceeds to the step S306. At the step S306, the count value of the counter K is set to "K+1 =1". The flow then returns to the step S303 through the step S311. After that, these steps are repeated until data "1" is detected at a transmission point of time D3, i.e., until data D3(1) is detected. Since, in this instance, the step S306 is executed three times before detection of the data "1", the count value of the counter K becomes "3".

Accordingly, with the data "1" detected at the transmission point of time D3 of the transmission signal, the light emission for the pulse P3 is performed after the lapse of the time t1. Then, the counter K is set to "0", and the flow returns to the step S303. After that, since the data of each of the transmission points of time D2, D1 and D0 is "1", the light emission for each of the pulses P4, P5 and P6 is performed at the corresponding transmission point of time when the waiting time t4 lapses after the period of the transmission signal.

The details of the pulse emission processes of the step S301 of FIG. 3 and the step S310 of FIG. 4 are next described below with reference to FIG. 5.

Figure 5:
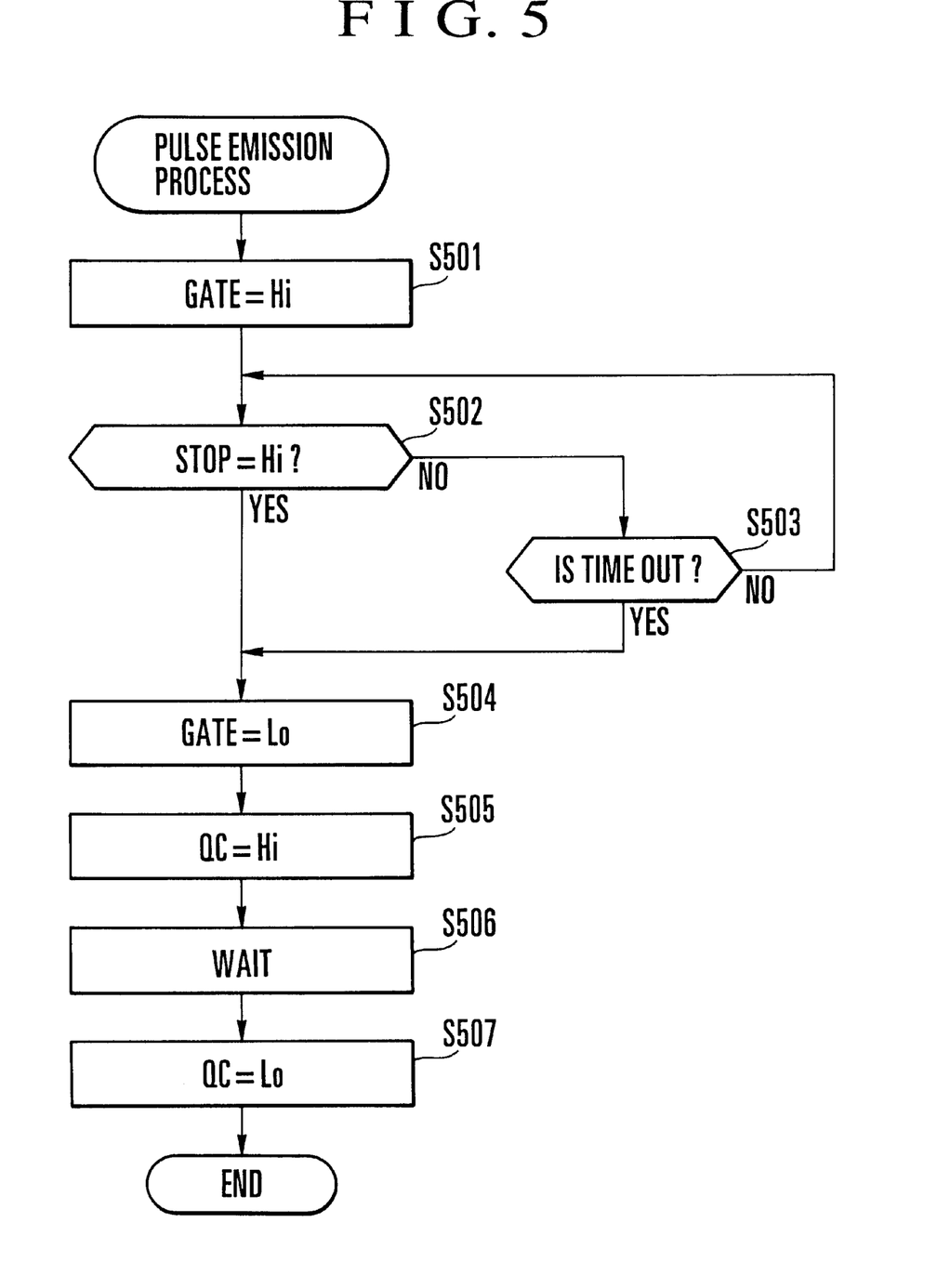
FIG. 5 is a flow chart showing the details of pulse light emission processes shown in FIGS. 3 and 4.

At a step S501 of FIG. 5, the microcomputer 30 sets the terminal GATE to a high level. Then, the IGBT 21 becomes conductive. The electric charge in the trigger capacitor 15 flows through the collector and emitter of the IGBT 21 and the trigger transformer 16. A voltage of one thousand and several hundred volts is then generated on the secondary side of the trigger transformer 16. As a result, the xenon tube 20 is excited by this voltage and the discharge current of the xenon tube 20 flows through the IGBT 21, so that light emission from the xenon tube 20 begins. When the xenon tube 20 beings to emit light, the light is received by the photodiode 25 which is light receiving means. A current flows through the photodiode 25 according to the amount of light emission. At the resistor 26, a voltage corresponding to the amount of light emission is generated. This voltage of the resistor 26 becomes higher than a voltage obtained by the voltage division by the resistors 27 and 28. The output voltage of the comparator 29 is thus inverted from a low level to a high level. Then, at a step S502, the microcomputer 30 makes a check to find if a voltage applied to the terminal STOP is at a high level. If so, the flow proceeds to a step S504 to bring the light emission of the xenon tube 20 to a stop. If not, the flow proceeds to a step S503.

At the step S503, if a predetermined period of time is found to have elapsed, the flow proceeds from the step S503 to the step S504 to forcibly terminate the light emission, even when the level of the terminal STOP is low. If not, the flow returns to the step S502. At the step S504, to bring the light emission to a stop, the microcomputer 30 sets the terminal GATE to a low level. By this process, the IGBT 21 is turned off to cut off the light emission current of the xenon tube 20. Then, the light emission comes to a stop. At the next step S505, to charge the voltage doubling capacitor 13 at a high speed for the purpose of performing the next light emission, the microcomputer 30 sets the terminal QC to a high level. The high level of the terminal QC renders the transistor 10 conductive to quickly charge the voltage doubling capacitor 13 only through the resistor 8.

At a step S506, to wait for completion of the process of charging the voltage doubling capacitor 13 which requires a predetermined period of time, a waiting time (WAIT) before the light emission is set. At a step S507, upon completion of the quick charging process of the voltage doubling capacitor 13, the microcomputer 30 sets the terminal QC to a low level, so that the transistor 10 is turned off to bring the flow of pulse emitting processes to an end.

Further, when the light emission is terminated by turning off the IGBT 21, there remain some ions of xenon within the xenon tube 20. Therefore, the xenon tube 20 has a low impedance of only several ohms to bring the potential on the cathode side thereof up to about the same level as the potential on the anode side thereof. The trigger capacitor 15 is, therefore, automatically charged with a voltage thus obtained, so that preparation for the next light emission can be completed.

In the above-described embodiment, with the start pulse of the transmission signal used as a reference timing point, the delay (lag) correction is arranged to be short when the light emission pulse interval is long, and is arranged to be long when the light emission pulse interval is short. However, the object of the invention can be likewise attained by arranging a negative lag correction time to be long to have light emission made earlier than the reference time, when the interval between the preceding light emission pulse and the current light emission pulse is long, and by arranging the negative lag correction timing to be short to have light emission made immediately before the reference time when the interval between the preceding light emission pulse and the current light emission pulse is short.

In the foregoing description, the embodiment is arranged to count the time intervals between pulses. The arrangement, however, may be changed to have predetermined transmission data decoded beforehand, and to make a schedule of light emission timing on the basis of information on the light emission pulse train.

In the embodiment described above, the timing of exciting and causing light emission by the light emission control means is corrected on the basis of the value of time count of the light emission intervals in such a way as to make the light emission intervals almost constant. Therefore, even in a case where lagging of the actual light emission signal with respect to the information signal is anticipated, the timing of excited light emission can be adequately corrected, so that the light emission pulse intervals can be prevented from becoming uneven, thereby ensuring accurate transmission of optical information.

Further, since the timing of excited light emission is decided on the basis of the time intervals of light emission pulses, the intervals between the light emission pulses can be prevented from becoming uneven.

Further, the arrangement for causing the timing of excited light emission to be short when the light emission interval is long and to be long when the light emission interval is short makes the intervals of the light emission pulses constant, so that the intervals between the light emission pulses are prevented from becoming uneven.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

Further, in the invention, the embodiments described above or the technical elements thereof may be combined with each other according to necessity.

Further, the invention also applies to cases where each claim or the whole or a part of the arrangement of each of the embodiments constitutes one apparatus or is used in combination with another apparatus or as a component element of an apparatus.

What is claimed is:

1. An information transmitting apparatus using flash light emission, comprising:

a flash light emission tube;

light-emission-signal outputting means for detecting communication data at timing synchronized with a predetermined period and for, when the detected communication data indicates a light emission instruction, forming and outputting a predetermined light emission signal to cause said flash light emission tube to make light emission; and varying means for varying a time interval from a point of time at which the light emission instruction has been detected to a point of time at which the light emission signal is outputted, according to a time interval from a point of time at which the preceding light emission has been performed to a point of time at which the light emission instruction for the current light emission is detected.

2. An information transmitting apparatus according to claim 1, wherein said varying means includes means for setting the time interval from a point of time at which the light emission instruction has been detected to a point of time at which the light emission signal is outputted shorter accordingly as the time interval from a point of time at which the preceding light emission has been performed to a point of time at which the light emission instruction for the current light emission is detected is longer.

3. An information transmitting apparatus according to claim 1, wherein said information transmitting apparatus is detachably mountable on a camera, and said communication data corresponds to data transmitted from the camera.

4. An information transmitting apparatus according to claim 1, wherein said flash light emission tube is used for flash photography.

* * * * *

UNITED STATES PATENT AND TRADEMARK OFFICE
CERTIFICATE OF CORRECTION

PATENT NO. : 6,167,199
DATED : December 26, 2000
INVENTOR(S) : Hajime Fukui

Page 1 of 1

It is certified that error appears in the above-identified patent and that said Letters Patent is hereby corrected as shown below:

Column 3,
Line 6, delete "arrange m ent" and insert -- arrangement --.
Line 11, delete "information" and insert -- information. --.

Column 5,
Line 61, delete "110001111" and insert -- 10001111 --.

Signed and Sealed this

First Day of January, 2002

Attest:

JAMES E. ROGAN
Attesting Officer
Director of the United States Patent and Trademark Office